July 3, 1923.

L. B. YEISER ET AL

COMBINED HOT AND COLD WATER VALVE

Filed July 21, 1919  3 Sheets-Sheet 1

July 3, 1923.
L. B. YEISER ET AL
1,460,931
COMBINED HOT AND COLD WATER VALVE
Filed July 21, 1919   3 Sheets-Sheet 2
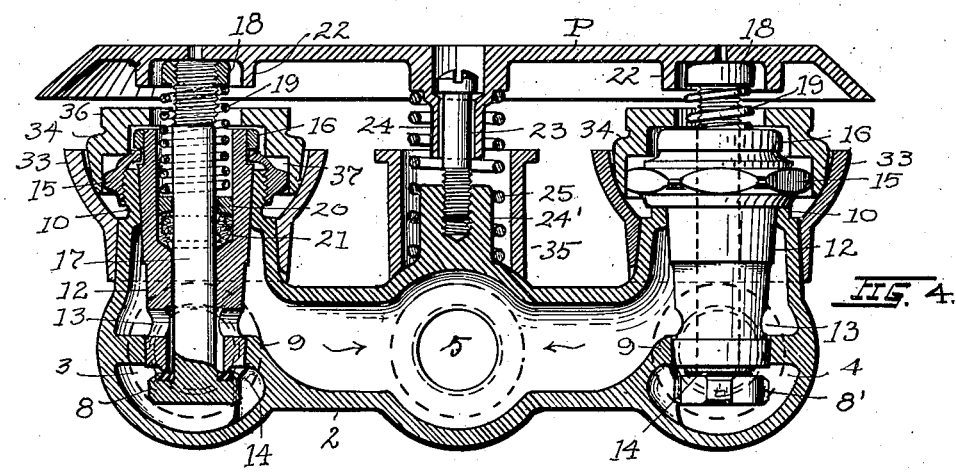

Patented July 3, 1923.

1,460,931

UNITED STATES PATENT OFFICE.

LEON B. YEISER AND FREDERICK C. LEHMANN, OF CLEVELAND, OHIO.

COMBINED HOT AND COLD WATER VALVE.

Application filed July 21, 1919. Serial No. 312,205.

*To all whom it may concern:*

Be it known that LEON B. YEISER and FREDERICK C. LEHMANN, citizens of the United States, residing at Cleveland, in the county of Cuyahoga and State of Ohio, have invented certain new and useful Improvements in a Combined Hot and Cold Water Valve, of which the following is a specification.

The present invention consists of a combined hot and cold water valve having a single foot pedal adapted to control the delivery of different streams of water to a wash basin, kitchen sink, or any other place where hot and cold water are supplied separately through different pipes and discharged separately or together through a single spout or separate spouts. In use, this combination valve is usually placed upon or within the floor beneath the lavatory where foot pressure can be applied by the person desiring to use the lavatory or the flow of the water from the spout, leaving the hands of the person entirely free for washing or the work to be accomplished. The conception embraces the use of a single pedal or plate adapted to cover a pair of valves, whereby either valve may be operated separately or both valves jointly through pressure imparted to either end or the middle of the pedal or plate at the election of the operator. The device is also particularly constructed to permit it to be confined or embedded within the material used in making the floor, whether concrete or wood, and the device is also provided with special valve seating members allowing convenient removal of the valve members from the main body in making inspections and repairs. The pedal or cover plate is also made detachable to give access to the valve parts beneath it.

Figure 1:
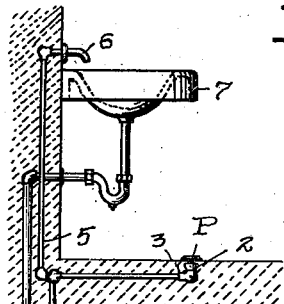
Figure 2:
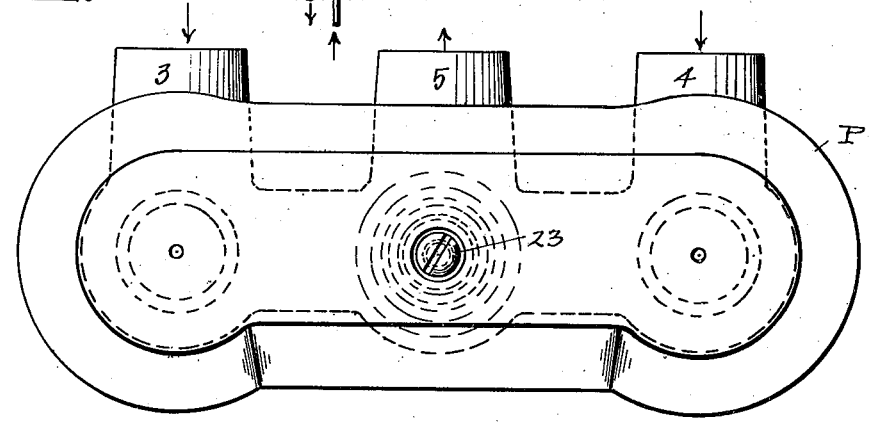
Figure 3:
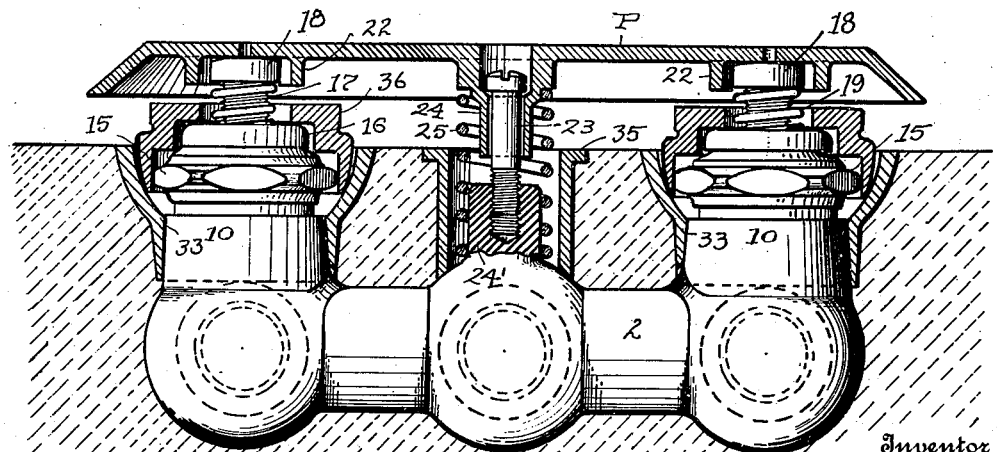
Figure 14:
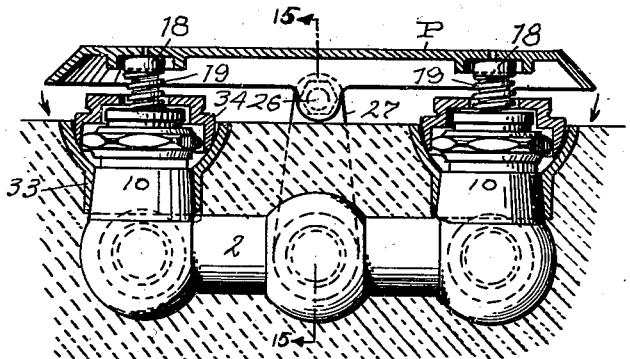
Figure 15:
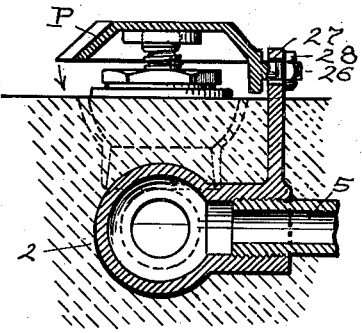
Figure 16:
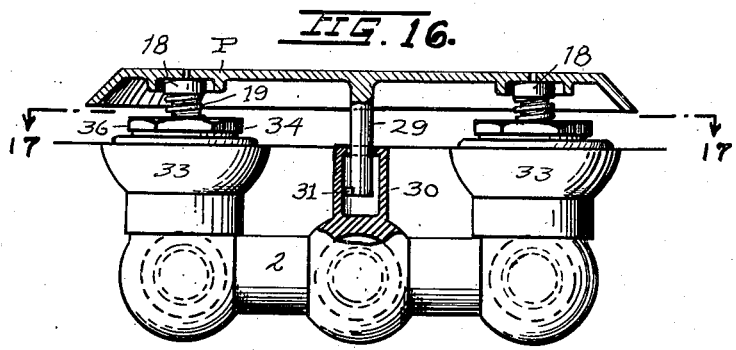
Figure 17:
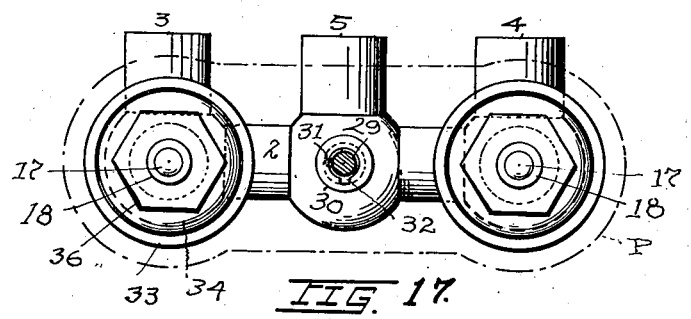

In the drawings accompanying this application, Fig. 1 is a reduced view of a lavatory equipped with our invention. Fig. 2 is a top plan view of our improved combination valve alone, and Fig. 3 is a front view, partly in section, of the same device. Fig. 4 is a vertical section on the longitudinal median line of the device, except that one valve and its seating plug is shown in side elevation. Fig. 5 is a side view of one valve and its seating plug as it appears when removed bodily from the combination body, and Fig. 6 is a vertical sectional view transversely through the body on the line of one of its supply passages. Figs. 7 to 12, inclusive, are detail views of the several parts which comprise the valve and seating plug shown in Fig. 5. Fig. 13 is a perspective view of one of the removable wrench caps which cover and enclose the projecting parts of the valves at the floor line. Fig. 14 is a front view and section of a modified form of the invention, and Fig. 15 is a vertical cross section on line 15—15, Fig. 14. Figs. 16 and 17 are sectional and top plan views, respectively, of a further modification involving a lock adapting the pedal and cover plate to be conveniently removed. Fig. 18 is a sectional view of a modified form of a valve seating plug.

The invention comprises an elongated hollow cast-metal body 2 having a mixing chamber internally and separate water inlets 3 and 4 at opposite ends thereof and a single water outlet 5 midway between its ends, and separate screw-threaded extensions at one and the same side of the body to permit separate supply pipes and a single discharge pipe to be connected laterally with said body. The outlet pipe 5 terminates in a spout 6 placed within or above a lavatory bowl 7, and either hot or cold water or a mixture of hot and cold water may be discharged from the spout into this bowl by depressing the spring-pressed valve members 8 and 8', respectively, opposite intakes 3 and 4 in body 2. The opposite ends of body 2 and the separate valves therein are constructed alike and a description of one applies to the other. Thus, body 2 has a horizontal diaphragm or wall 9 opposite each intake passage and also a reduced screw-threaded extension or neck 10 above and opposite each diaphragm or wall, and central openings are formed opposite each other in the diaphragm and extension which taper inwardly and downwardly to receive and seat a tapered valve plug 12 having an annular valve seat 14 at its lower end through which the water is adapted to pass upwardly and thence outwardly through side openings 13 when the valve members 8 and 8' are depressed. An absolutely water-tight joint is obtained between the tapered ends of the plug and the tapered sides of the body by grinding the tapered plug to such tapered seats, and each plug is wedged and removably held in place within the body by a ring nut 15 having rotatable shoulder engagement with the reduced upper extremity of the plug and also screw engagement with the screw-threaded neck 10. A collar 16 is sweated or affixed to the upper end of the plug above the ring nut 15 to prevent displacement or removal of the ring nut, and this collar is rigid with the plug so that when the ring nut is unscrewed the plug and the valve parts therein will be forcibly lifted and withdrawn from the tapered seats in body 2.

A stem 17 forms part of valve member 8 and extends through plug 12, and a screw collar or nut 18 is adjustable longitudinally on the stem and bears against a coiled compression spring 19 sleeved upon the stem between said nut 18 and a packing gland 20 within the lower part of an enlarged bore or chamber 21 in the upper half of plug 12. Spring 19 co-acts with the water pressure to raise and close the valve 8 at end seat 14, and said spring also presses the gland member 20 downwardly to compress the packing about the stem. The tension of the spring can be changed by rotating the screw collar or nut 18 thereby effecting a corresponding change in compression of the packing and a modified seating effect and movement in the valve.

The upper end of the valve stem, or the nut 18 for each valve in body 2, is covered and engaged by a single bar or pedal plate P, and circular recesses or annular ribs 22 at the underside of this plate confine the nuts 18 and prevent lateral displacement of plate P when at rest. The connection between the pedal plate and each valve stem is preferably a free connection to permit either stem and its valve to be depressed without operating the other stem and valve, although both valve stems may be depressed together by placing the foot midlength of the plate and applying the requisite pressure.

The pedal plate is also preferably anchored to body 2 to prevent accidental displacement or to limit its upward movement, and several modes of attachment are shown herein. In Figs. 3 and 4 we show a headed screw 23 extending through a socket portion 24 centrally in the pedal plate and engaged with a boss 24' on body 2, and a loose fit is provided between the plate and screw to permit tilting and sliding movements of the plate. A spiral spring 25 is also sleeved over boss 24' to uphold and provide a yielding fulcrum for the plate. In Figs. 14 and 15, we show the pedal plate provided with a lateral projection 26 at one side centrally between its ends, and this projection is pivotally and loosely engaged with a perforated post 27 on body 2 so as to permit the pedal plate to rock and be depressed at either end and also at its middle. A nut 28 secures the pedal plate detachably upon the post.

In Figs. 16 and 17, we show a pedal plate having a dependent stem 29 at its center and underside, and the lower end of this stem is loosely held within a hollow stud 30 to permit the plate to rock and move upwardly and downwardly within limits. A lateral projection 31 on stem 29 prevents the stem from being withdrawn from the stud and the plate detached from body 2 when the plate is in its proper covering and engaging relation with the valve stems, but by raising and partly turning the plate to bring the projection 31 in register with a key-way 32 in the inturned flange at the upper end of the stud it is possible to remove and disengage the plate bodily from the body.

In installing this combination valve in the floor beneath a lavatory, especially in a concrete floor, we prefer to employ a sleeve or cup 33 and a cap 34 to enclose the valve stem together with the nut which secures the tapered plug in body 2, and the central connection for the pedal plate may be enclosed likewise by a tube or thimble 35. In this way the valve body may be completely embedded in the cement or concrete beneath the floor line and still accessible for inspection and repairs, and the mounting of the valve parts in removable plug 12 greatly facilitates removal of the valve parts from body 2. The enclosing cap 34 for nut 15 is also particularly constructed with a wrench engaging border 36 at its top and a hexagon or equivalent recess 37 at its bottom whereby nut 15 may be screwed upon or unscrewed from the body through the medium of said cap and a wrench applied to the exposed border 36. Cap 34 guards the valve parts at the floor line and its depending flange fits snugly within the mouth of cup 33 to prevent accumulation of dirt around the nut and valve stem.

In Fig. 18, a plug is shown as having an internally threaded bore or chamber in its upper end in which a screw-threaded thimble 20' is adapted to be inserted to support the valve stem 17 and spring 19, and the upper end of this thimble has an annular flange or shoulder 16' adapted to overlap or overlie the nut 15, and this shoulder performs the same function as collar 16. The valve and plug are otherwise constructed substantially as hereinbefore described.

What I claim is:

1. A pair of valves and a cover plate removably superposed thereover and depressible at either end and midway of its ends whereby either valve or both valves may be opened at the election of the operator.

2. A valve having hot and cold water intakes and an outlet, plugs removably seated opposite said intakes, valve members supported within said plugs adapted to control the flow of water to the outlet, a depressible operating plate common to and covering said valve members, and means adapted to raise said operating member.

3. A valve body having hot and cold water passages opening into a mixing chamber, tapered plugs removably mounted within said body having valve members adapted to control the discharge of water into said chamber, and a single cover and floor plate connected with and adapted to operate either or both of said valve members.

4. A combined hot and cold water valve, comprising a chambered body having a pair of spring-pressed valve members adapted to control separate streams of water thereinto, and a single pedal plate spanning and surmounting said valve members and detachably connected in tilting covering position upon said body.

5. A combined hot and cold water valve, comprising a chambered body having separate water inlets and an outlet, a pair of spring-pressed valve members adapted to control the flow of water through said inlets, a pedal plate engaged with the said valve members, and means adapted to detachably anchor said plate in tilting covering position upon said body.

6. A combined hot and cold water valve, comprising a chambered body having separate water inlets and an outlet, separate valves adapted to control the intake of water into said body, a depressible pedal plate spanning said body and engaging said valve members, and a yielding fulcrum for said plate intermediate said valve members adapting the plate to be depressed and the valve members operated independently or jointly.

7. A combined hot and cold water valve, comprising a chambered body having separate water inlets and an outlet, valve members adapted to control the intake of water into said body, a depressible pedal plate adapted to operate said valve member, and means centrally of said plate and body adapted to unite said parts while permitting depressible movements of said plate at each end and between its ends.

8. In a combined hot and cold water valve, a chambered body having separate water inlets and an outlet, a set of valve members mounted within opposite ends of said body, a depressible pedal plate mounted in tilting covering position upon said body adapted to operate said valve members, spring means adapted to uphold said pedal plate, and means detachably connecting said plate with said body adapted to permit free tilting movements of said pedal plate relatively to said body.

9. A combined hot and cold water valve, comprising a one-piece body having a mixing chamber and separate water inlets and an outlet, valve members controlling the flow of water to said mixing chamber, a depressible pedal plate completely covering said body and closely seated in respect thereto adapted to operate said valve members, and a spring adapted to seat said pedal plate centrally between its ends.

10. A combined hot and cold water valve having a pair of projecting valve members, and an operating device for said valve members comprising a tilting pedal plate engaged with said members and having a central stem detachably interlocking said plate with a free working connection with said body at an intermediate point between said valve members.

11. A combined hot and cold water valve, comprising a chambered body having a pair of valve members controlling the intake of water thereto and extending outwardly from said body at opposite ends thereof, and a depressible plate engaging said valve members having a central stem detachably connected in tilting position upon a central portion of said body.

12. A combined hot and cold water valve, comprising a valve body having a pair of valve members extending therefrom, and an elongated depressible plate engaged with said members in alignment with said body having a depending stem in sleeved engagement with said body, said plate and body having interlocking portions adapted to permit removal of the plate from said body when shifted out of alignment.

13. In a combined hot and cold water valve as described, a pedal plate having an anchoring extension and a pair of annular recesses at its bottom.

14. A combined hot and cold water valve, comprising a chambered body adapted to be set within a floor having a pair of valve members adapted to extend therefrom above the level of said floor, means adapted to encircle and protect the exposed portions of said valve members at the floor line, and a pedal plate operatively engaged with said valve members.

15. A combined hot and cold water valve, comprising a chambered body, a set of valve members having operating stems projecting from said body, a protecting cap for each stem, and a depressible plate mounted to tilt upon said body and surmounting and covering said body and stems and caps.

16. A combined hot and cold water valve, comprising a body having a pair of extensions, a valve member removably seated within each extension having an exposed operating stem, a cup encircling each extension, a protecting cap surrounding each stem and removably seated in each cup, and a depressible operating plate engaged with said stems and covering said caps.

17. A combined hot and cold water valve, comprising a body having a central mixing chamber and separate extensions, a plug removably seated and secured within each extension, a valve member in each plug having an operating stem, a depressible operating plate spanning said body and engaged with each stem, and a spring adapted to raise each stem and said plate.

18. A combined hot and cold water valve, comprising a body having water passages and a pair of screw-threaded extensions, a tapered plug and screw-nut removably engaged with each extension, a valve member in each plug having a depressible operating stem, a spring adapted to lift and close said valve member, and a depressible plate mounted to tilt upon said body in covering relation to all said parts and operatively engaged with said stems.

19. A combined hot and cold water valve, comprising a body having water passages and a pair of screw-threaded extensions at its upper side, a removable plug and a screw-nut engaged with each extension, a valve member having an operating stem extending through each plug, a cap member having detachable interlocking wrench engagement with each screw-nut, and a depressible member engaged with said stems.

20. A combined hot and cold water valve, comprising a body having water passages and tapered seats, a pair of tapered plugs having end and side water passages and valve seats, a depressible valve member mounted within each plug having an operating stem, a coiled spring adapted to lift and close each valve member, a screw-nut adapted to press each plug to its seat within said body, and a common operating member for both valve members.

21. A combined hot and cold water valve having a body with a pair of valve members mounted therein and provided with a hollow post at its middle having a key-opening in its top, and a depressible plate engaged with said valve members having a central depending stem with a lateral projection loosely engaged within said hollow post.

Signed at Cleveland, in the county of Cuyahoga, and State of Ohio, this 14th day of July, 1919.

LEON B. YEISER.
FREDERICK C. LEHMANN.